United States Patent [19]

Fernandez et al.

[11] Patent Number: 4,961,215
[45] Date of Patent: Oct. 2, 1990

[54] CONTINUOUS RADIO ANNOUNCER

[75] Inventors: Robert Fernandez, Hialeah Gardens; Jesus Sanchelima, Miami, both of Fla.

[73] Assignee: F.M.R. Devices, Inc., Hialeak Gardens, Fla.

[21] Appl. No.: 281,620

[22] Filed: Dec. 9, 1988

[51] Int. Cl.⁵ .......................................... H04M 11/08
[52] U.S. Cl. ........................................ 379/56; 379/88; 379/101
[58] Field of Search ..................... 379/101, 88, 56, 87, 379/55, 67; 381/79, 77; 340/825.25

[56] References Cited

U.S. PATENT DOCUMENTS

| | | | |
|---|---|---|---|
| 2,038,647 | 4/1936 | Clausen | 379/101 X |
| 3,974,338 | 8/1976 | Luzier et al. | 379/72 X |
| 4,110,560 | 8/1978 | Leary et al. | 379/339 |
| 4,255,618 | 3/1981 | Danver et al. | 381/77 |
| 4,389,546 | 6/1983 | Glisson et al. | 379/88 |
| 4,571,457 | 2/1986 | Hattori et al. | 379/56 |
| 4,685,133 | 8/1987 | Iggulden | 381/3 |
| 4,741,020 | 4/1988 | Deal et al. | 379/67 |
| 4,837,797 | 6/1989 | Freeny, Jr. | 379/96 |

FOREIGN PATENT DOCUMENTS 0101156  5/1987  Japan ..................... 379/88

OTHER PUBLICATIONS

Mitel, (Application Notes), Integrated DTMF Transceiver, Jan. 1988, pp. 3-157, through 3-172.
High Speed Optocouplers, Hewlett Packard, (Application Notes), Aug. 1983.
Video Optocoupler HCPL-4562, Hewlett Packard, (Application Notes), May 1988, pp. 1-6.

Primary Examiner—Thomas W. Brown
Attorney, Agent, or Firm—J. Sanchelima

[57] ABSTRACT

A continuous radio announcer device capable of transmitting a stored sound message in digitized format at predetermined time intervals. The radio announcer device includes a central unit and a remote unit that can be remotely accessed and the sound messages are stored in memory. The remote unit is a stand along device that can also be programmed on site. If remotely accessible, a modem and associated coded signals need to be provided to effect the communication over the public telephone network or through a wireless transmission. The amount of stored information will depend on the size of the memory.

5 Claims, 4 Drawing Sheets

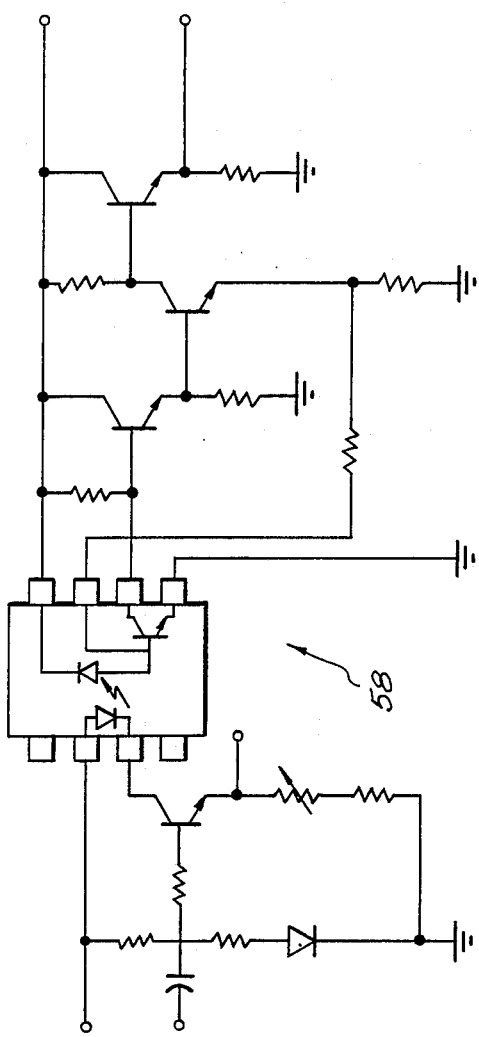
FIG-4-
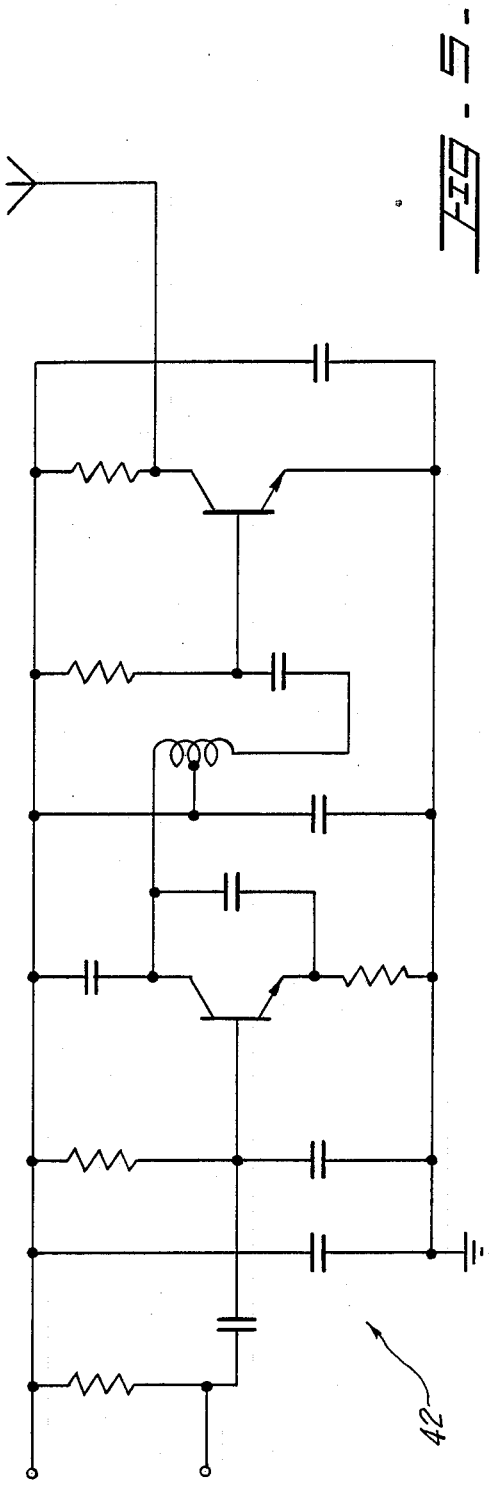
FIG-5-

CONTINUOUS RADIO ANNOUNCER

BACKGROUND OF THE INVENTION

1. Field of the Invention.

The present invention relates to continuous radio announcers, and more particularly, to such devices that include digital means for storing sounds and messages.

2. Description of the Related Art.

We believe that the closest reference corresponds to U.S. Pat. No. 4,685,133 issued to Iggulden. However, it differs from the present invention because it describes a tape driven mechanism using a transmitter whereas the present invention claims a more flexible and volumetrically efficient device where the sound message is stored digitally and capable of being modified more readily and remotely.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a reliable and volumetrically efficient continuous radio announcer that is capable of storing a sound message digitally.

It is another object of this invention to provide such a device that can be readily accessed through the telephone lines and the stored message changed remotely either through the public telephone network or wireless means.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is a representation of the schematic for an optocoupler circuit.

FIG. 5 is the representation for the schematic of a transmitter used in one of the preferred embodiments for the present invention.

DETAILED DESCRIPTION OF THE PREFERRED EMBODIMENT

Figure 1:
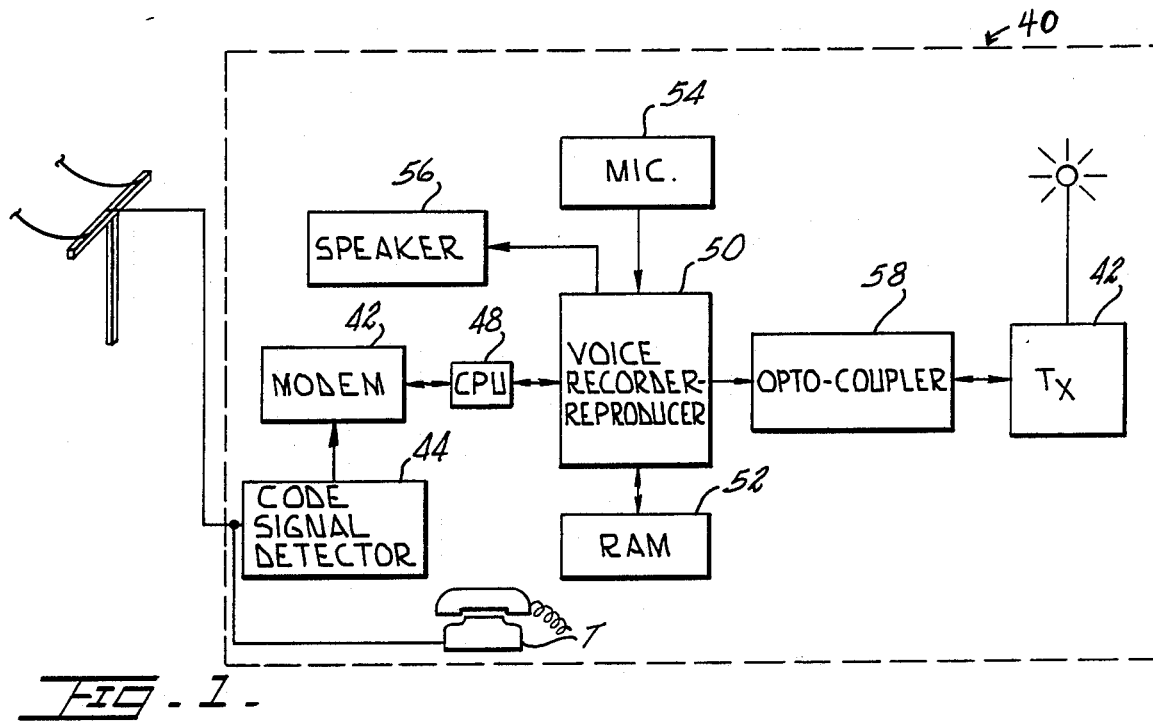
FIG. 1 represents a block diagram of the remote unit incorporating an embodiment using modems for the present invention.
Figure 1A:
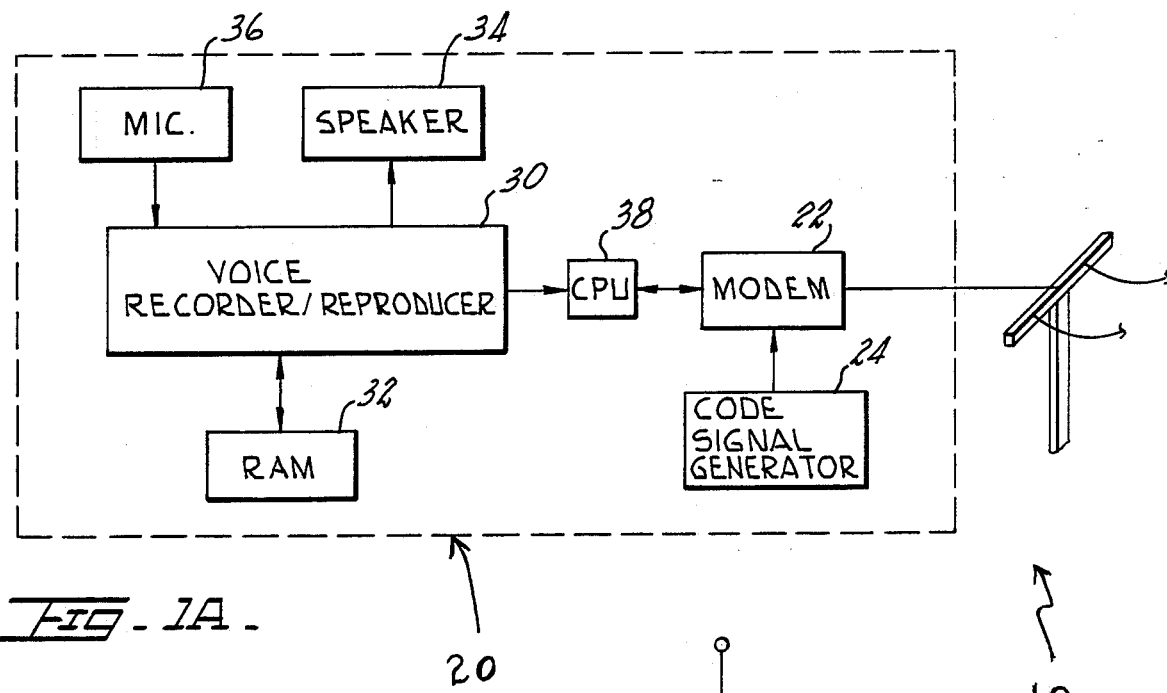
FIG. 1A shows a block diagram of the central unit connected to the public network.
Figure 1B:
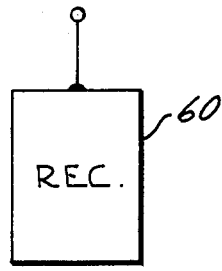
FIG. 1B represents a reciever.

Referring now to FIGS. 1, 1A and 1B, where the present invention is generally referred to with numeral 10, it can be observed that it basically includes a central announcer assembly 20, remote announcer assembly 40 and receiver assembly 60. Preferably, receiver 60 will be the AM/FM receiver conventionally found in almost all automobiles since it is desired that most persons have access to the message being continuously transmitted. In one of the envisioned applications, a real estate firm has a central announcer assembly 20 at its office and several remote announcer assemblies 40 inside the properties listed with the firm. Each one of assemblies 40 has a pre-recorder message that is being continuously transmitted, in the preferred embodiment, and that can be changed, if desired, without requiring the physical presence at the site where the remote announcer assembly 40 is located. Other applications can involve the use of wireless tranmissions or dedicated lines and would still be within the spirit of the present invention.

Describing now the different components of the invention, it can be seen again from FIG. 1, that home announcer assembly 20 includes a voice recorder/reproducer circuit 30, associated RAM circuit 32, speaker 34, a microphone device 36. This is implemented with Toshiba's LSI TC-8830F which is a CMOS Voice Recording and Reproducing integrated circuit for digitally storing and playing back sound messages. See Applications Notes incorporated to this application by reference. Microphone 36 and speaker 34 are connected to voice recording and reproducing circuit 30 so that messages can be recorded and played back. A CPU circuit 38 is used to assemble and transmit the information in RAM circuit 32 associated with voice recording and reproducing circuit 30 to remote announcer assembly 40 through modern circuit 22. Modern circuit 22 is connected to coded signal generator circuit 24 that creates a predetermined signal that is transmitted through modem circuit 22 and the public telephone network to modem circuit 42 of remote announcer assembly 40.

Code signal detector circuit 44 monitors the telephone line that services the remote premises and is connected to telephone T. The telephone service to premises is not interfered with since the parallel connection of circuit 44 is not activated until the coded signal is detected. If the code signal is present, circuit 44 activates modem circuit 42 thereby connecting the telephone line to mircroprocessor circuit 48 which in turn controls vocie recording/reproducing circuit 50. Depending on the control signals recieved, microprocessor circuit 48 instructs circuit 50 to perform any one of a multitude of possible operations. One of these operations can be to replace the contents of RAM circuit 52 with new digital information transmitted. This information then is transmitted by low power transmitter 42. Another possible operation is to program circuit 50 for continously playing back the stored message or do to edit a message by copying, cutting and pasting predetermined segments of the information or phrases stored in RAM circuit 52.

Remote announcer assembly 40 also includes microphone 54 and speaker 56 in order to provide the flexibility for changing the recording on site and being able to play it back. Also, with sufficient memory and adequate software, a prospect at the remote area can record a message (typically his name and telephone number) that would eventually be transmitted back to the central office at a predetermined time that would not interrupt the homeowner's use of the telephone service. Therefore, it is quite easy to collect information from interested parties and transmit same back to a central location.

Figure 3:
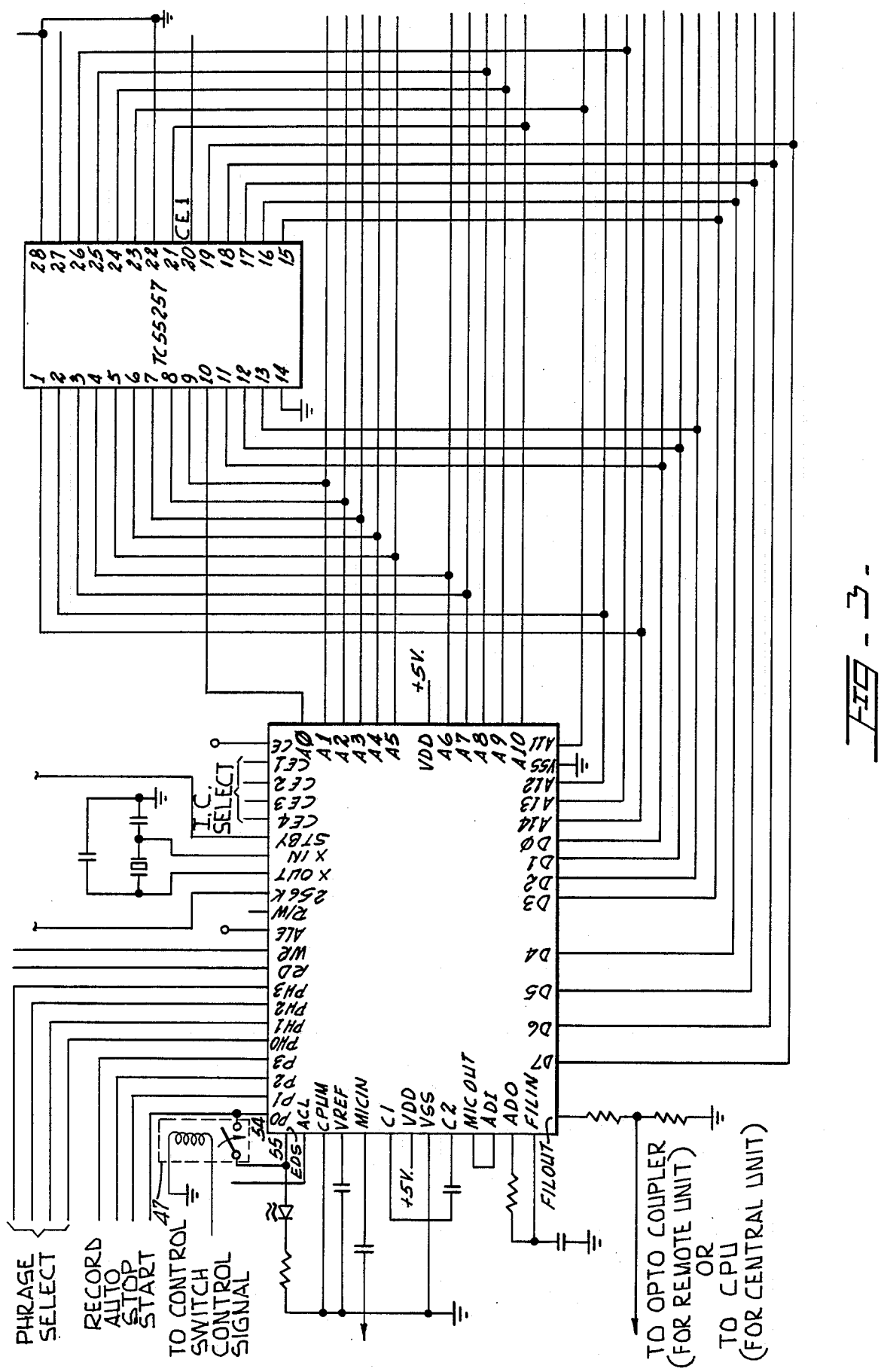
FIG. 3 illustrates a schematic representation of the remote announcer assembly's voice recorder/reproducer circuit and its connections.

Also, it has been found that Toshiba's chip can be continuously activated if pins 54 (PO) and 55 (EDS) are connected together, as shown in FIG. 3. When pin 55 goes high, if forces pin 54 to start the playback mode. Nowhere in the Application Notes does the manufacturer of voice recorder/reproducer circuit 30 suggest this mode of operation. It has been found that shorting pins 54 and 55 provide reliable means for continuously playing back the stored message. This connection is, preferably, accomplished through relay member 47 and microprocessor circuit 48 so that it can be programmed for predetermined time intervals. In the real estate application mentioned above, the remote announcer would transmit during hours when prospects would be expected to drive by. A sign would be used to inform the prospect to tune his radio to a specific frequency and the times during which the announcement is transmitted.

An optocoupling circuit 58 is used in the preferred embodiment to transmit the modulating audio signal from circuit 50 to low power transmitter 42, as shown in FIGS. 4 and 5. Optocoupling circuit 58 is implemented, in the preferred embodiment, with Hewlett Packard's Video Optocoupler HCPL-4562. The application notes thereto are incorporated by reference.

Figure 2:
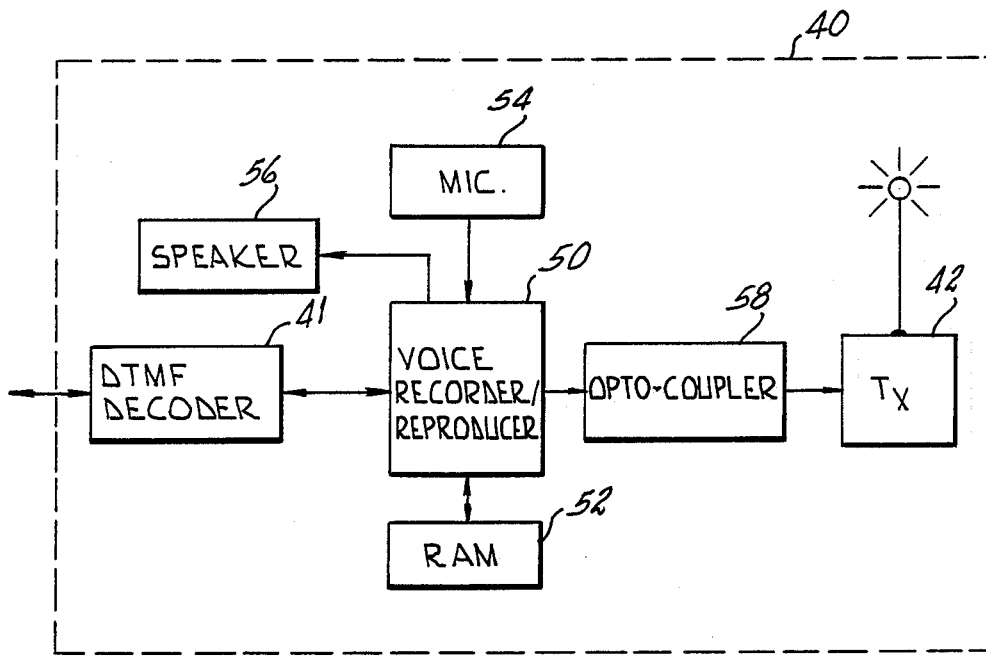
FIG. 2 represents an alternate embodiment of the remote unit using DTMF transceivers.
Figure 2A:
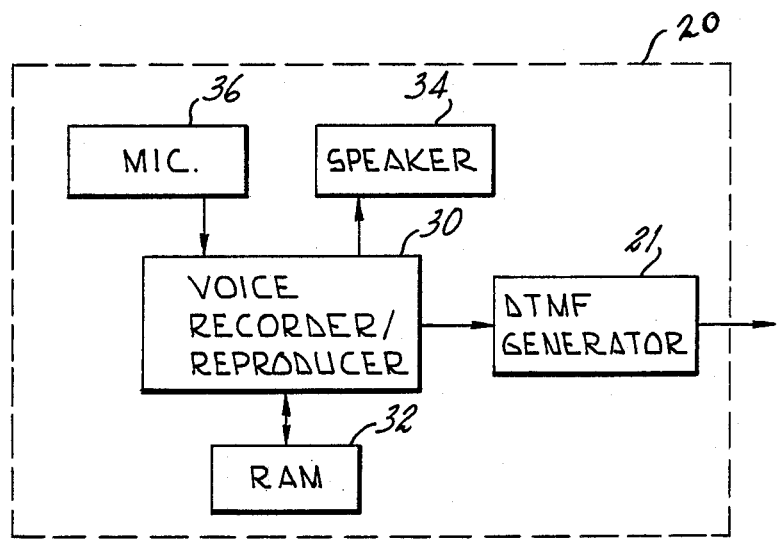
FIG. 2A shows a block diagram of the alternate embodiment for the central unit using DTMF transceivers.
Figure 2B:
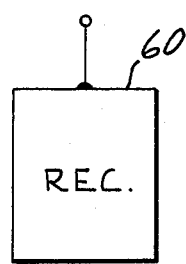
FIG. 2B represents conventional receiver.

An alternate embodiment is shown in FIGS. 2 and 2A where a DTMF decoder 41 and generator 21 are used. Generator 21 and decoder 41 are preferably implemented with Mitel's Integrated DTMF Transceiver MT8880. The application notes are hereby incorporated by reference. This approach eliminates the need for using a modem and mircroprocessor and places the control on the caller who would then be required to generate the pertinent codes from conventional tone telephones.

It is believed the foregoing description conveys the best understanding of the objects and advantages of the present invention. Different embodiment may be made of the inventive concept of this invention. It is to be understood that all matter disclosed herein is to be interpreted merely as illustrative, and not in a limiting sense.

What is claimed is:

1. A continuous radio announcer, comprising:
    A. first means for recording and reproducing sound messages having an output and including first random access memory means for storing said sound messages in digitized format;
    B. transmitter means connected to said output for transmitting said sound messages;
    C. receiver means tunable to said transmitter means' frequency;
    D. first modem means connected to said first sound recording and reproducing means;
    E. a telephone network connected to said first modem means;
    F. second means for recording and reproducing sound messages having second random access memory means for storing said sound messages;
    G. second modem means connected to said second sound recording and reproducing means and to said telephone network;
    H. first microprocessor means for assembling and transmitting the information in said first random access memory means and being connected to said first sound recording and reproducing means and to said first modem means; and
    I. second microprocessor means connected to said second sound recording and reproducing means so that the information recorded in said first and second random access means can be exchanged through said first and second modem means and through said first and second sound recording and reproducing means.

2. The announcer set forth in claim 1 further including:
    J. coded signal generating means connected to said second modem means for sending a coded signal to said telephone network; and
    K. coded signal detection means connected to said telephone network and to said first modem means so that said first modem means is activated when said coded signal is sensed.

3. The announcer set forth in claim 2 wherein said first microprocessor means is programmed to activate said transmitter means and said first means for recording and reproducing sound messages during pre-determined time intervals.

4. The announcer set forth in claim 3 wherein said first means for recording and reproducing sound messages includes microphone means for recording voice so that said voice when recorded can be transmitted to said second means for recording and reproducing sound messages for its eventual retrieval.

5. The announcer set forth in claim 4 wherein said receiver means is the radio receiver of a vehicle.

* * * * *